(12) United States Patent
Katoh

(10) Patent No.: US 8,933,799 B2
(45) Date of Patent: Jan. 13, 2015

(54) DISPLAY DEVICE FOR VEHICLE

(75) Inventor: Takahira Katoh, Kariya (JP)

(73) Assignee: Denso Corporation, Kariya (JP)

( * ) Notice: Subject to any disclaimer, the term of this patent is extended or adjusted under 35 U.S.C. 154(b) by 119 days.

(21) Appl. No.: 13/199,503

(22) Filed: Aug. 31, 2011

(65) Prior Publication Data

US 2012/0056736 A1 Mar. 8, 2012

(30) Foreign Application Priority Data

Sep. 7, 2010 (JP) ................................. 2010-200166

(51) Int. Cl.
*B60Q 1/00* (2006.01)
*B60Q 3/04* (2006.01)
*B60K 35/00* (2006.01)

(52) U.S. Cl.
CPC ............. *B60Q 3/044* (2013.01); *B60K 35/00* (2013.01); *B60Q 3/046* (2013.01); *B60K 2350/1096* (2013.01)
USPC ......... 340/459; 340/438; 340/461; 340/425.5

(58) Field of Classification Search
CPC ............ B60R 16/0235; B60R 16/0236; B60R 16/0232; B60R 16/0231; B60K 37/02
USPC ............... 340/425.5, 438, 439, 459, 461, 462
See application file for complete search history.

(56) References Cited

U.S. PATENT DOCUMENTS

| 4,286,683 A | * | 9/1981 | Zeigner et al. ................ 180/54.1 |
| 5,121,112 A | * | 6/1992 | Nakadozono ............ 340/870.16 |
| 7,032,393 B2 | * | 4/2006 | Tamai et al. .................... 62/115 |
| 7,091,839 B2 | * | 8/2006 | Situ et al. ....................... 340/438 |
| 2007/0018802 A1 | * | 1/2007 | Chen et al. .................... 340/438 |

FOREIGN PATENT DOCUMENTS

| JP | 10-309962 | 11/1998 |
| JP | 2000-168398 | 6/2000 |
| JP | 2003-312314 | 11/2003 |
| JP | 2005-81866 | 3/2005 |
| JP | 2008-168818 | 7/2008 |

OTHER PUBLICATIONS

Office Action issued Nov. 19, 2013 in corresponding JP Application No. 2010-200166 (with English translation).

* cited by examiner

*Primary Examiner* — Steven Lim
*Assistant Examiner* — Hongmin Fan
(74) *Attorney, Agent, or Firm* — Harness, Dickey & Pierce, PLC

(57) ABSTRACT

A display device for a vehicle includes an information acquiring unit, a display unit and a control unit. The information acquiring unit acquires vehicle information regarding the vehicle. The vehicle information includes engine information indicating an engine on and off state. The control unit controls the display unit to display the vehicle information when the engine information indicates an engine on state. Further, the display unit controls the display unit to discontinue the display of the vehicle information once when the engine on state of the engine information is switched to the engine off state, and to restart display of the vehicle information.

11 Claims, 8 Drawing Sheets

US 8,933,799 B2

DISPLAY DEVICE FOR VEHICLE

CROSS REFERENCE TO RELATED APPLICATION

This application is based on Japanese Patent Application No. 2010-200166 filed on Sep. 7, 2010, the disclosure of which is incorporated herein by reference.

FIELD OF THE INVENTION

The present invention relates to a display device for a vehicle for displaying vehicle information regarding the vehicle.

BACKGROUND OF THE INVENTION

In a display device for vehicles, it has been proposed to continue display of vehicle information regarding the vehicle after an engine, such as an internal combustion engine for running the vehicle, is turned off. Such a display device is, for example, described in JP10-309962A, JP2000-168398A, JP2005-81866A and JP2008-168818A.

For example, a display device described in JP2000-168398 has a liquid crystal display unit for displaying vehicle information and a microcomputer that controls the liquid crystal display unit to display the vehicle information when the engine is in operation. The microcomputer controls the liquid crystal display unit to continue the display of the vehicle information if insertion of the ignition key is detected after the engine is stopped.

A display device described in JP2005-81866A has a dial plate with a pointer for indicating vehicle information on the dial plate, and a control circuit for controlling rotation of the pointer along the dial plate. The control circuit controls the pointer to indicate the vehicle information such as a fuel level when an ignition switch for turning on and off the engine is in an on state. Further, the control circuit controls the pointer to keep a rotational angle for a predetermined period of time after the ignition switch is turned off, thereby to continue the display of the vehicle information.

A display device described in JP2008-168818A has a dial plate with a pointer for indicating vehicle information on the dial plate as a main indicator and a display control unit for controlling a rotation of the pointer. The display device of JP2008-168818A further has a sub-indicator. When the ignition switch is turned off, the display control unit controls the main indicator to stop the indication of the vehicle information as well as controls the sub-indicator to begin an image display of the vehicle information.

In the display device of JP2005-81866A, a user can know the vehicle information through the pointer on the dial plate, even after the engine stopped by turning off the ignition switch. In the display device of JP2008-168818A, similarly, a user can know the vehicle information through the image display by the sub-indicator, even after the engine is stopped by turning off the ignition switch.

In some conventional display devices prior to the display devices of JP2005-81866A and JP2008-168818A, the display of the vehicle information is turned off when the engine is stopped. In such a case, the user can recognize that the engine is not in operation because the display of the vehicle information is turned off. In the display devices of JP2005-81866A and JP2008-168818A, on the other hand, even if the control circuit or the display control unit acquires information indicating an engine off state, the control circuit or the display control unit controls the display unit to continue the display of the vehicle information. Therefore, it is difficult to clearly show the user that the engine is in the off condition, due to the continuous display of the vehicle information.

SUMMARY OF THE INVENTION

The present invention is made in view of the foregoing matter, and it is an object of the present invention to provide a display device for a vehicle, capable of reducing user's misunderstanding and providing vehicle information with a user even after an engine is stopped.

According to an aspect of the present invention, a display device for a vehicle includes an information acquiring unit for acquiring vehicle information regarding a vehicle, a display unit for displaying the vehicle information, and a control unit for controlling the display unit. The vehicle information includes engine information indicating an engine on and off state. The control unit controls the display unit to display the vehicle information when the engine information indicates an engine on state, to discontinue display of the vehicle information once when the engine on state indicated by the engine information is switched to an engine off state, and to restart the display of the vehicle information.

In such a configuration, since the display of the vehicle information is discontinued once when the engine on state is switched to the engine off state, a user can readily know that the engine is stopped. As such, it is less likely that the user will misunderstand as if the engine is in operation after the engine is stopped. Further, since the display of the vehicle information is restarted, the user can obtain the vehicle information even after the engine is stopped.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

Exemplary embodiments will be hereinafter described with reference to the drawings. Like parts are designated with like reference numbers throughout the exemplary embodiments, and a description thereof will not be repeated.

First Embodiment

Figure 1:
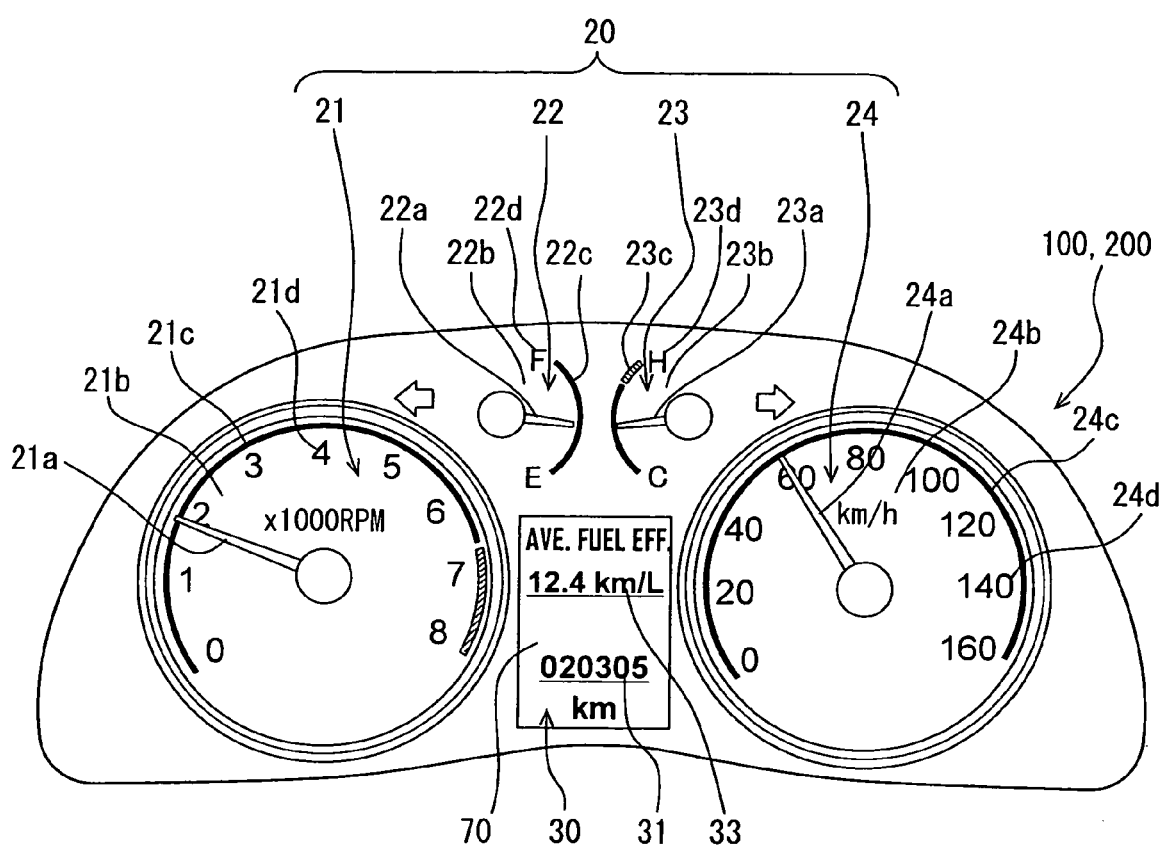
FIG. 1 is a front view of a combination meter, in a state where an ignition of a vehicle is in an on state, according to a first embodiment of the present invention.

Referring to FIG. 1, a combination meter 100 as a display device is housed in an instrument panel at a front part of a passenger compartment. The combination member 100 is arranged such that a front face shown in FIG. 1 faces a driver seat.

First, a structure of the combination member 100 will be described.

The combination meter 100 is mounted in a vehicle with an engine, such as an internal combustion engine for running the vehicle. The combination meter 100 displays various statuses regarding the vehicle as vehicle information.

The combination meter 100 includes a pointer display section 20 and a liquid crystal display section 30. The pointer display section 20 includes a tachometer 21, a fuel gauge 22, a water temperature gauge 23, a speedometer 24, and the like.

The tachometer 21, the fuel gauge 22, the water temperature gauge 23 and the speedometer 24 are provided with dial plates 21b through 24b and pointers 21a through 24a, respectively. Each of the pointers 21a through 24a rotates along the surface of the corresponding dial plate 21b through 24b.

The dial plate 21b, 24b of each of the tachometer 21 and the speedometer 24 is provided with a scale design portion 21c, 24c and a number design portion 21d, 24d. The scale design portion 21c, 24c has a circular shape defining a center at the center of rotation of the pointer 21a, 24a. The number design portion 21d, 24d is formed on an inner side of the scale design portion 21c, 24c.

The dial plate 22b, 23b of each of the fuel gauge 22 and the water temperature gauge 23 is provided with a scale design portion 22c, 23c and character/letter design portions 22d, 23d. The scale design portion 22c, 23c has an arcuate shape defining a center at the center of rotation of the pointer 22a, 23a. Also, the character/letter design portions 22d, 23d are formed at ends of the scale design portion 22c, 23c.

In the pointer display section 20, therefore, the vehicle information is shown by the pointers 21a through 24a pointing the scale design portions 21c through 24c, the numerical design portions 21d, 24d and the character/letter design portions 22d, 23d. Specifically, the tachometer 21 shows rotational speed information indicating a rotational speed of an output shaft of the internal combustion engine. The fuel gauge 22 shows fuel level information indicating the amount of fuel in a fuel tank. The water temperature gauge 23 shows coolant temperature information indicating the temperature of a coolant for cooling the internal combustion engine. The speedometer 24 shows travel speed information indicating a traveling speed of the vehicle.

The scale design portions 21c through 24c, the numerical design portions 21d, 24d and the character/letter design portions 22d, 23d are luminous-displayed by transmitting light under a condition having less external light. The pointers 21a through 24a are configured to self-illuminate, and thus emit light under a condition having less external light.

The liquid crystal display section 30 includes a liquid crystal panel 70. The liquid crystal display section 30 shows vehicle information by images formed in a display screen of the liquid crystal panel 70. The images formed in the display screen of the liquid crystal panel 70 are, for example, an odometer image 31, a fuel efficiency gauge image 33, a fuel level gauge image 32 (see FIG. 3B); a trip meter image (not shown), a shift indicator image (not shown), a door warning image (not shown), and the like.

Figure 2:
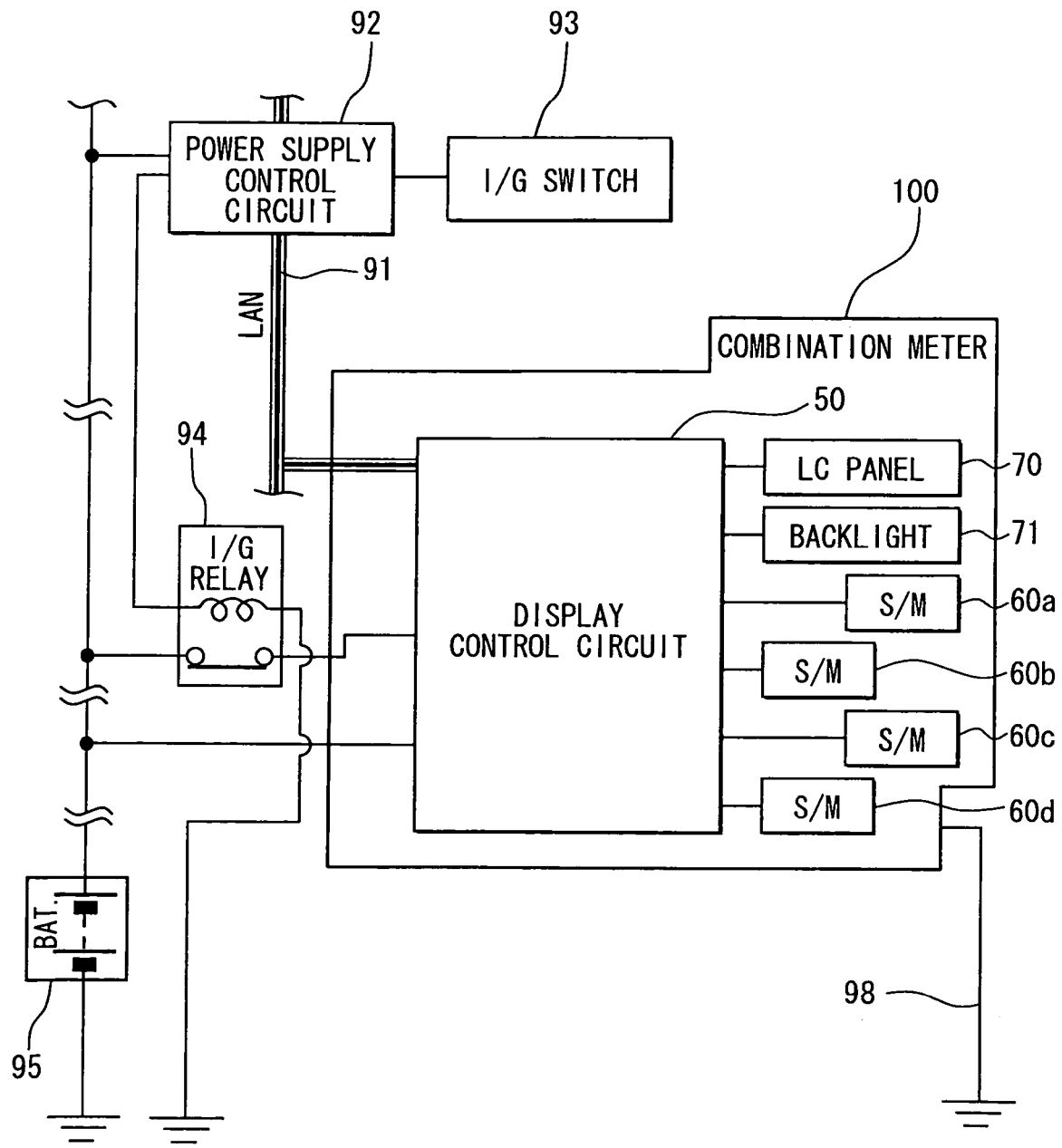
FIG. 2 is a block diagram illustrating an electrical structure of the combination meter according to the first embodiment.

Next, an electrical structure of the combination meter 100 will be described with reference to FIG. 2.

The combination member 100 includes a display control circuit 50, stepper motors 60a through 60d, the liquid crystal panel 70, a backlight 71, and the like. The combination member 100 is connected to an in-vehicle local area network (LAN) 91, an external battery 95, an ignition relay 94, a grounding line 98.

The display control circuit 50 acquires the vehicle information, and controls the pointer display section 20 and the liquid crystal display section 30 to display the acquired vehicle information through the pointer display section 20 and the liquid crystal display section 30. The display control circuit 50 includes a processor for executing various computations, a flash memory storing programs used for the computation and information regarding the vehicle, a RAM functioning as work regions for the computation, and the like.

The display control circuit 50 further includes a driving circuit (not shown) for controlling pixels of the liquid crystal panel 70 and a regulator circuit (not shown) for controlling illumination of the backlight 71. The display control circuit 50 further has a driving circuit (not shown) for controlling a rotation of each stepper motor 60a through 60d and a regulator circuit (not shown) for controlling illumination of a light emitting diode for illuminating the pointer display section 20.

The display control circuit 50 has a first electric supply line that is always electrically connected to the battery 95, and a second electric supply line via an ignition relay 94. The display control circuit 50 is supplied with electric power from the battery 95.

The display control circuit 50 is connected to the in-vehicle LAN 91 to acquire the vehicle information regarding the vehicle from the in-vehicle LAN 91. For example, the vehicle information includes vehicle information indicating an engine on and off state, travel distance information indicating the distance traveled, fuel level information indicating the amount of fuel in the fuel tank, door information indicating a door condition, such as a door open state and a door closed state, and the like. The vehicle information further includes speed information indicating a running speed of the vehicle, coolant temperature information indicating the temperature of coolant, rotational speed information indicating a rotational speed of an output shaft of the internal combustion engine, average fuel efficiency information indicating an average fuel efficiency of the vehicle, and the like.

Each of the stepper motors 60a through 60d has a pointer shaft (not shown) that rotates in accordance with a control signal from the driving circuit of the display control circuit 50. The pointer 21a through 24a is fixed to the pointer shaft of the stepper motor 60a through 60d. The stepper motors 60a through 60d rotate the pointers 21a through 24a via the pointer shafts, thereby to show the vehicle information in the pointer display section 20, as shown in FIG. 1.

Figure 3A:
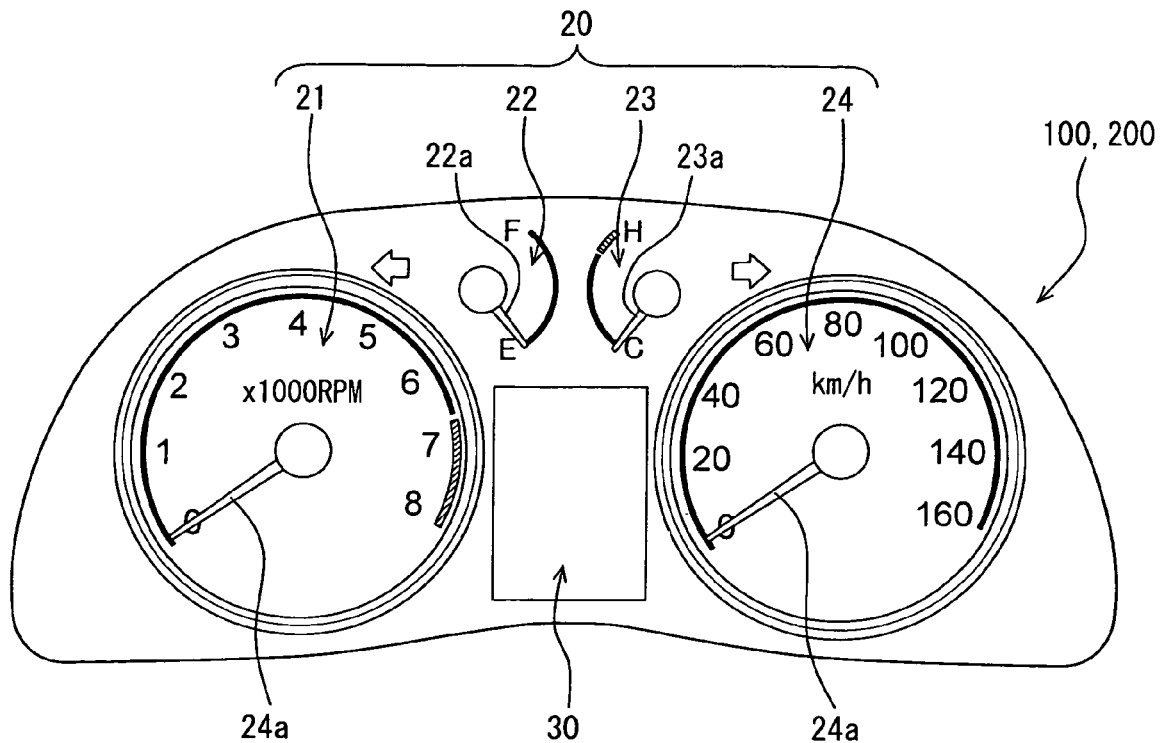
FIG. 3A is a front view of the combination meter, in a state where the ignition is turned off, according to the first embodiment.
Figure 3B:
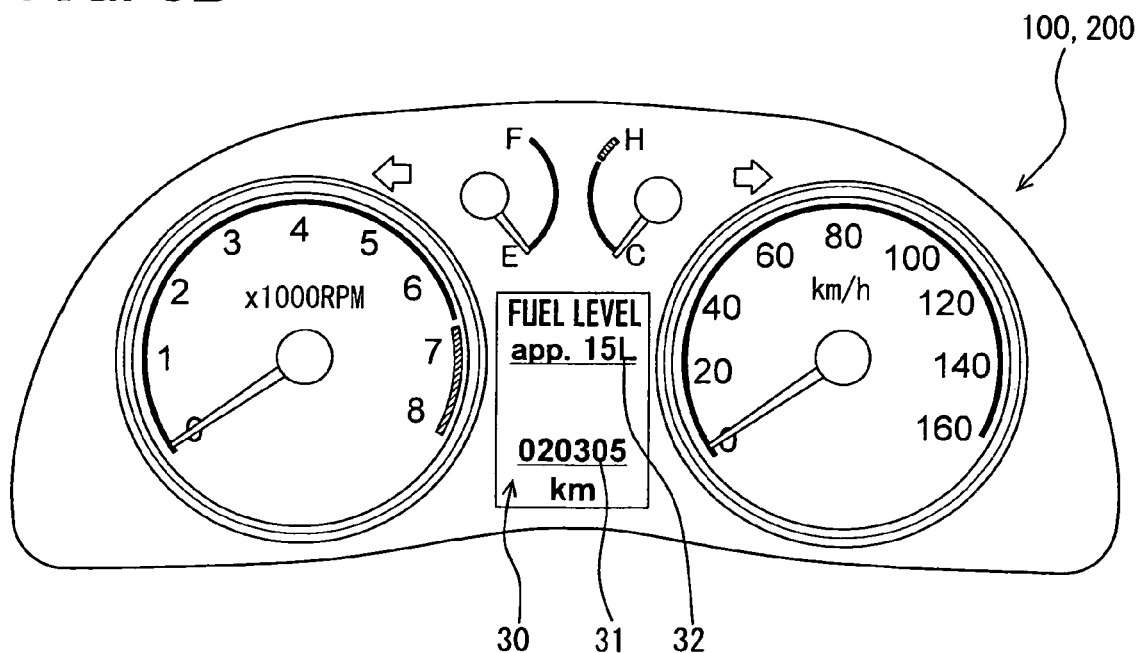
FIG. 3B is a front view of the combination meter, in a state where display of vehicle information is restarted, according to the first embodiment.

The liquid crystal panel 70 is, for example, a dot matrix-type transparent liquid crystal panel having multiple pixels arranged in a matrix shape. Each of the pixels of the liquid crystal panel 70 is driven in accordance with the control signal from the driving circuit of the display control circuit 50, thereby to form an image indicating the vehicle information, as shown in FIG. 1 and FIG. 3B.

The backlight 71 is disposed on the back side of the liquid crystal panel 70 to illuminate the liquid crystal panel 70 from the back side. The backlight 71 includes the light emitting diode and a diffuser panel to evenly illuminate the liquid crystal panel 70. The image formed on the liquid crystal panel 70 is luminously displayed by the light from the backlight 71.

A power supply control circuit 92 is disposed on the in-vehicle LAN 91. The power supply control circuit 92 is connected to the battery 95, the ignition switch 93, the ignition relay 94, an engine control circuit (not shown), and the like. The power supply control circuit 92 is supplied with power from the battery 95.

The power supply control circuit 92 detects a user's operation (e.g., pressing operation) of the ignition switch 93. That is, the power supply control circuit 92 detects whether the ignition switch 93 is operated by a user (e.g., driver) to turn on or off the ignition. When the ignition is turned on, the power supply control circuit 92 applies a voltage to the ignition relay 94 to set the ignition relay 94 in an electrically conducted state. Further, the power supply control circuit 92 outputs the engine information to the in-vehicle LAN 91 based on the user's operation of the ignition switch 93 detected by the power supply control circuit 92. For example, the engine information indicates the engine on state to start the engine or the engine off state to turn off the engine. The engine control circuit starts the internal combustion engine based on the engine information outputted from the power supply control circuit 92 into the in-vehicle LAN 91.

In such a configuration, the display control circuit 50 acquires the engine information, and controls the pointer display section 20 and the liquid crystal display section 30 to display the vehicle information when the acquired engine information indicates the engine on state, that is, when the engine off state is switched to the engine on state. The display control circuit 50 also acquires the vehicle information other than the engine information.

The display control circuit 50 calculates a rotating direction, an angle of rotation, a rotational speed and the like of the pointer shaft of each of the stepper motors 60a through 60d, based on the acquired vehicle information. The display control circuit 50 generates a pulse power corresponding to the calculation result to each of the stepper motors 60a through 60d to control the pointer shaft.

Further, the display control circuit 50 controls the pixels of the liquid crystal panel 70 based on the acquired vehicle information. Moreover, the display control circuit 50 further controls the light emitting diode and the backlight 71 to illuminate the pointer display section 20 and the liquid crystal display section 30. In this way, the display of the vehicle information by the pointer display section 20 and the liquid crystal display section 30 is turned on, as shown in FIG. 1.

Next, an operation of the combination meter 100 will be described in detail with reference to FIGS. 1 through 4.

Figure 4:
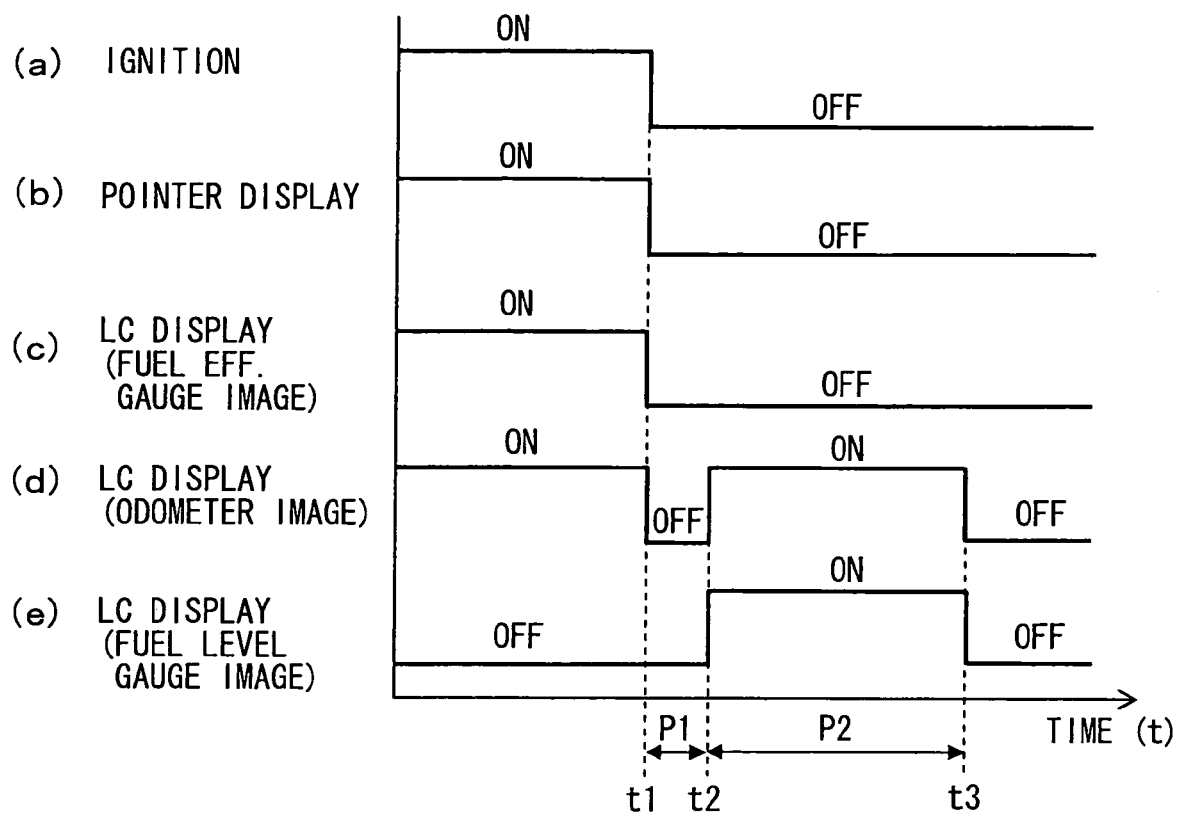
FIG. 4 is a time chart illustrating an operation of the combination meter according to the first embodiment, in which (a) illustrates a change in an on and off state of an ignition; (b) illustrates a change in an on and off state of a pointer display section; (c) illustrates a change in an on and off state of a fuel efficiency gauge image in a liquid crystal display section; (d) illustrates a change in an on and off state of an odometer image in the liquid crystal display section; and (e) illustrates a change in an on and off state of a fuel level gauge image in the liquid crystal display section.

FIG. 4 illustrates a time chart illustrating the operation of the combination meter 100 associated with the operation of the ignition switch 93, in which (a) illustrates a change in an on and off state of the ignition switch 93 operated by the user, (b) illustrates a change in an on and off state of the pointer display section 20, (c) illustrates a change in an on and off state of the fuel efficiency gauge image in the liquid crystal display section 30, (d) illustrates a change in an on and off state of the odometer image in the liquid crystal display section 30, and (e) illustrates a change in an on and off state of the fuel level gauge image 32 in the liquid crystal display section 30.

In a condition where the vehicle information is displayed in the pointer display section 20 and the liquid crystal display section 30, as shown in FIG. 4(a), if the ignition switch 93 is operated by the user to turn off the vehicle ignition at a timing t1, the power supply control circuit 92 stops the voltage application to the ignition relay 94 to cut the electrical conduction between the battery 95 and the display control circuit 50 via the ignition relay 94. Further, the power supply control circuit 92 switches the engine on state of the engine information to the engine off state, and outputs the engine information to the in-vehicle LAN 91.

When the engine on state of the engine information is switched to the engine off state, the display control circuit 50 controls the pointer display section 20 and the liquid crystal display section 30 to discontinue display of the vehicle information at the timing t1, as shown in FIGS. 4(b) through (d). Specifically, the display control circuit 50 outputs a pulse power to each of the stepper motors 60a through 60d for returning the pointer 21a through 24a to the zero point. Also, the display control circuit 50 stops the control of the pixels of the liquid crystal panel 70. Further, the display control circuit 50 stops the voltage application to the light emitting diode of the pointer display section 20 and the backlight 71. Accordingly, as shown in FIG. 3A, the display of the vehicle information by the pointer display section 20 and the display of the vehicle information such as the odometer image 31, the fuel efficiency gauge image 33 and the like by the liquid crystal display section 30 are turned off once.

The display control circuit 50 controls the liquid crystal display section 30 to restart the display of the vehicle information after the display of the vehicle information is turned off once at the timing t1. The display control circuit 50 counts a time elapsed from the timing t1. When a predetermined time period P1 (e.g., approximately 15 seconds) has elapsed from the timing t1, that is, at the timing t2, the display control circuit 50 begins to drive the pixels of the liquid crystal panel 70 to start digital display of the odometer image 31 and the fuel level gauge image 32 in numerical, form in the liquid crystal display section 30, as shown in FIGS. 4(d) and (e).

By the above operation of the display control circuit 50, as shown in FIG. 3B, the display of the odometer image 31 and the fuel level gauge image 32 is in the on state. In this way, the fuel level information is shown by the fuel gauge 22 in the engine on state, and is shown by the fuel level gauge image 32 of the liquid crystal display section 30 in the engine off state.

The display control circuit 50 controls the liquid crystal display section 30 to stop the display of the vehicle information again when a predetermined time period P2 (e.g., approximately 90 seconds) has elapsed since the restart of the display of the vehicle information. As shown in FIGS. 4(d) and (e), the display control circuit 50 controls the liquid crystal panel 70 to stop the driving of the pixels when the predetermined time period P2 has elapsed from the timing t1, that is, at the timing t3. Thus, the display of the odometer image 31 and the fuel level gauge image 32 is turned off at the timing t3. Accordingly, the display of the vehicle information by the liquid crystal display 30 is turned off again; as shown in FIG. 3A.

Figure 5:
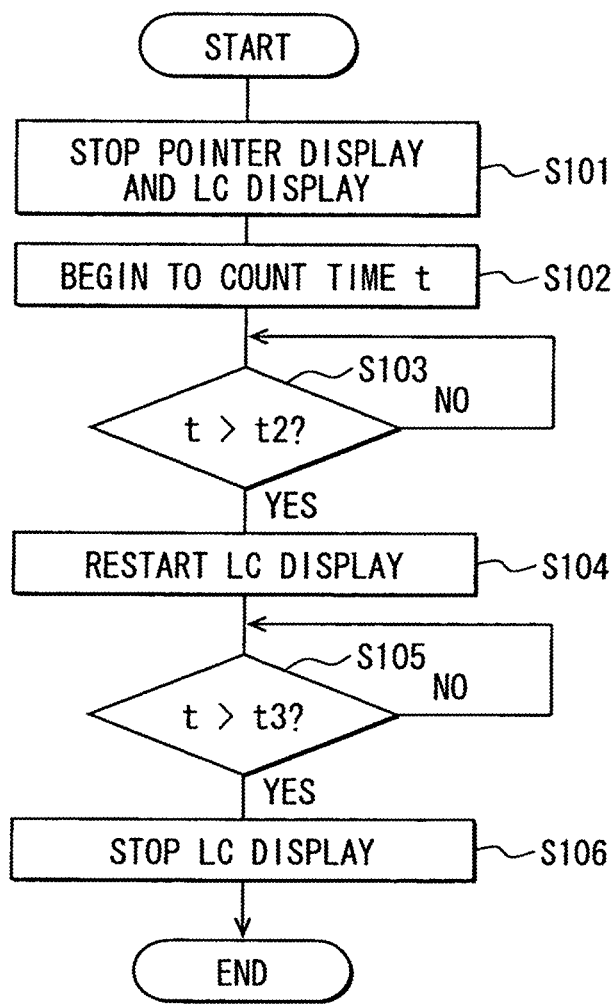
FIG. 5 is a flow chart illustrating a control flow performed by a display control circuit of the combination meter according to the first embodiment.

Next, a processing of redisplaying the vehicle information in the liquid crystal display section 30 will be described with reference to FIG. 5. The processing shown in FIG. 5 is performed by the display control circuit 50 when the engine on state of the engine information is switched to the engine off state.

At S101, the pointer display section 20 and the liquid crystal display section 30 are controlled to discontinue the display of the vehicle information once, and the processing proceeds to S102. In the pointer display section 20, the display of the vehicle information is turned off because the pointers 21a through 24a are returned to the zero point. In the liquid crystal display section 30, the display of the vehicle information is turned off because the image is not formed by the liquid crystal panel 70.

At S102, the time counting is begun. That is, the elapsing time t from the timing t1 where the ignition is turned off and the engine on state of the engine information is switched to the engine off state is counted.

At S103, it is determined whether or not the time t reaches the timing t2. Here, the timing t2 used in the determination of S103 is a value indicating the time elapsing the predetermined time period P1 from the timing t1. That is, it is determined at S103 whether or not the predetermined time period P1 has elapsed since the timing t1, as shown in FIG. 4.

When it is determined at S103 that the time t exceeds the timing (value) t2, the processing proceeds to S104. On the other hand, when it is determined at S103 that the time t has not exceeded the timing t2, the determination of S103 is repeated until the time t exceeds the timing t2.

At S104, the liquid crystal display section 30 is controlled to restart the image display (e.g., digital display) of the vehicle information. As such, the odometer image 31 and the fuel level gauge image 32 are shown in the liquid crystal display panel 70, as shown in FIG. 3B.

At S105, it is determined whether or not the time t, which has begun to counting at S102, exceeds the timing t3. The timing t3 used in the determination of S105 is a value indicating the time elapsing the predetermined time period P2 since the timing t2 where the display of the vehicle information by the pointer display section 20 and the liquid crystal display section 30 is turned off, as shown in FIG. 4. That is, it is determined whether or not the predetermined time period P2 has elapsed since the timing t2.

When it is determined at S105 that the time t exceeds the timing t3, the processing proceeds to S106. On the other hand, when it is determined at S105 that the time t has not exceeded the timing t3, the determination of S105 is repeated until the time t exceeds the timing t3.

At S106, the liquid crystal display section 30 is controlled to turn off the display of the vehicle information again, and then the processing is ended. As such, in the liquid crystal display section 30, the odometer image 31 and the fuel level gauge image 32 displayed on the liquid crystal panel 70 are turned off, as shown in FIG. 3A.

In the present embodiment, when the engine on state of the engine information is switched to the engine off state, the display control circuit 50 controls the pointer display section 20 and the liquid crystal display section 30 to discontinue the display of the vehicle information once. Since the display of the vehicle information is turned off once, the engine off condition can be apparently indicated. Accordingly, the user, such as a driver, can realize that the engine is in the off condition. That is, it is less likely that the user will misunderstand as if the engine is in operation.

Further, the display control circuit 50 controls the liquid crystal display section 30 to restart the display of the vehicle information, after the display of the vehicle information by the pointer display section 20 and the liquid crystal display section 30 is stopped once. Therefore, the user can obtain the vehicle information even after the engine is stopped. That is, the combination meter 100 can provide the vehicle information even after the engine is stopped, and reduce the user's misunderstanding.

In addition, the vehicle information is redisplayed in the liquid crystal display section 30 after the predetermined time period elapses, without requiring user's any operation. Therefore, the combination meter 100 can properly provide the vehicle information with the user even after the engine is stopped.

For example, when the engine is not in operation, electric power cannot be generated using power from the engine. Therefore, when the engine is not in operation, it is preferable to save power used to display the vehicle information. As such, it is preferable to redisplay the vehicle information by only one of the pointer display section 20 and the liquid crystal display section 30. In general, the pointer display section 20 is apt to use more power to display the vehicle information than that the liquid crystal display 30 uses. In the present embodiment, therefore, the redisplay of the vehicle information is performed by the liquid crystal display section 30. In such a case, the combination meter 100 can provide the vehicle information with the user even after the engine is stopped while saving power consumption.

The display control circuit 50 controls the liquid crystal display section 30 to redisplay the vehicle information in order to provide the vehicle information with the user after the engine is stopped. In the present embodiment, therefore, considering the possibility that there is no user around the vehicle, the display of the vehicle information is turned off after the predetermined time period P2 has elapsed since the display of the vehicle information was restarted. In this way, since the display of the vehicle information is turned off again, the power used for displaying of the vehicle information can be reduced while properly providing the vehicle information with the user after the engine is stopped.

The user is more likely to be in a position separated from the combination meter 100, such as by getting off the vehicle, in the state where the engine is not in operation, as compared with a state where the engine is in operation. In the present embodiment, since the vehicle information is digitally displayed in the liquid crystal display 30, such as with numbers or the like, the user can readily see the vehicle information even if the user is at a separate position. In general, the vehicle information can be more clearly shown by the digital display than analog display. Therefore, the combination meter 100 can clearly provide the vehicle information with the user at a separate position.

In some countries, such as European countries, the user (e.g., driver) needs to input the travel distance of the vehicle to a pump of a gas station for paying by a credit card. That is, there is a demand for displaying the travel distance information even after the engine is stopped. Therefore, it is advantageous to display the travel distance information even after the engine is stopped, and it is preferable to include the odometer image 31 in the vehicle information redisplayed in the liquid crystal display section 30.

Also, in filling fuel to a fuel tank at a gas station, the user may decide the amount of fuel while referring to the remaining amount of fuel in a fuel tank. That is, there is a demand for displaying the fuel level even after the engine is stopped. Therefore, it is advantageous to display the fuel level information even after the engine is stopped, and it is preferable to include the fuel level gauge image 32 in the vehicle information redisplayed in the liquid crystal display section 30.

In the present embodiment, the liquid crystal display section 30 constitutes an image display section, and the liquid crystal display section 30 and the pointer display section 20 constitute a display unit. Also, the display control circuit 50 provides an information acquiring unit and a display control unit. The scale design portions 21a through 24c provides to a scale.

Second Embodiment

A second embodiment will be described with reference to FIGS. 6 and 7. A combination meter 200 as the display device according to the second embodiment is a modification of the first embodiment, and the redisplay of the vehicle information is started when the door is opened. That is, the timing of the redisplay of the vehicle information is determined based on the door information indicating the door open and closed state. Hereinafter, structures and operations different from those of the first embodiment will be mainly described.

Figure 6:
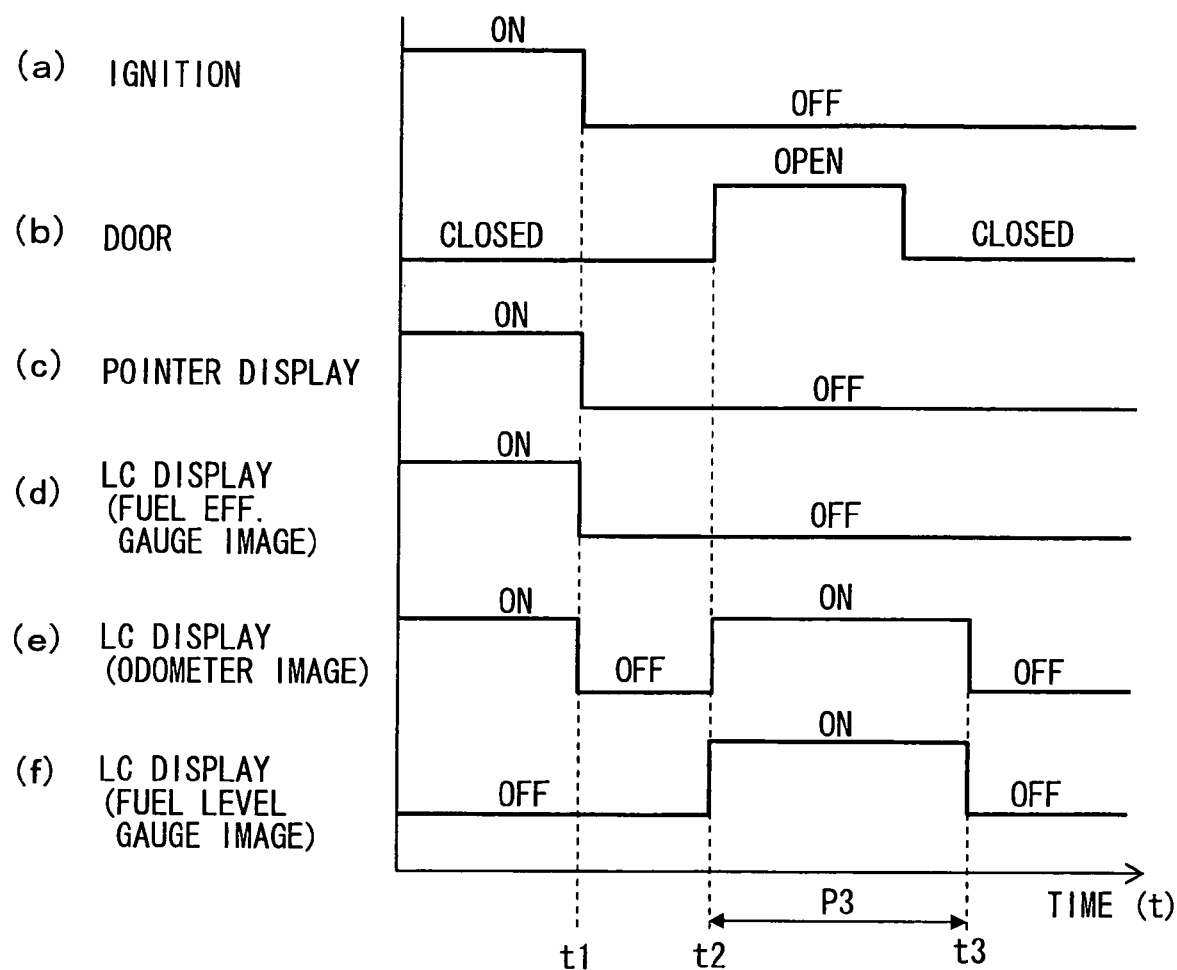
FIG. 6 is a time chart illustrating an operation of a combination meter according to a second embodiment, in which (a) illustrates a change in an on and off state of an ignition; (b) illustrates a change in a door open and closed state of the vehicle; (c) illustrates a change in an on and off state of a pointer display section; (d) illustrates a change in an on and off state of a fuel efficiency gauge image in a liquid crystal display section; (e) illustrates a change in an on and off state of an odometer image in the liquid crystal display section; and (f) illustrates a change in an on and off state of a fuel level gauge image in the liquid crystal display section.
Figure 7:
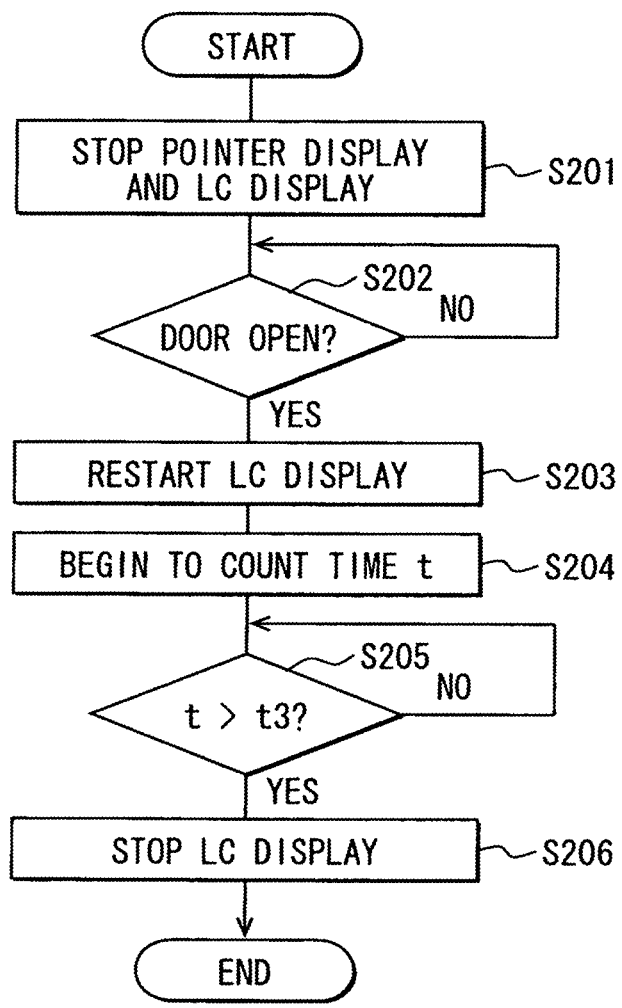
FIG. 7 is a flow chart illustrating a control flow performed by a display control circuit of the combination meter according to the second embodiment.

FIG. 6 illustrates a time chart illustrating the operation of the combination meter 200 associated with the operation of the ignition switch 93, in which (a) illustrates a change in an on and off state of the ignition switch 93 operated by the user, (b) illustrates a change in an open and closed state of the door; (c) illustrates a change in an on and off state of the pointer display section 20, (d) illustrates a change in an on and off state of the fuel efficiency gauge image in the liquid crystal display section 30, (e) illustrates a change in an on and off state of the odometer image in the liquid crystal display section 30, and (f) illustrates a change in an on and off state of the fuel level gauge image 32 in the liquid crystal display section 30.

In the state where the vehicle information is displayed in the pointer display section 20 and the liquid crystal display section 30, if the user operates the ignition switch 93 to turn off the ignition of the vehicle at the timing t1, the power supply control circuit 92 stops the voltage application to the ignition relay 94 to cut the electrical conduction between the battery 95 and the display control circuit 50 via the ignition relay 94. Further, the power supply control circuit 92 switches the engine on state of the engine information to the engine off state, and outputs the engine information to the in-vehicle LAN 91.

When the engine on state of the engine information is switched to the engine off state, the display control circuit 50 controls the pointer display section 20 and the liquid crystal display section 30 to discontinue the display of the vehicle information at the timing t1, as shown in FIGS. 6(c) through 6(e). By this operation of the display control circuit 50, the display of the vehicle information in the pointer display section 20 and the display of the vehicle information such as the odometer image 31 and the fuel efficiency gauge image 33 in the liquid crystal display 30 are turned off.

After the display of the vehicle information in the pointer display section 20 and the display of the liquid crystal display section 30 are turned off once, if the door closed state indicated by the door information, which is acquired through the in-vehicle LAN 91, is switched to the door open state, the display control circuit 50 controls the liquid crystal display section 30 to restart the display of the vehicle information.

In the example of FIG. 6(b), the timing t2 corresponds to a timing where the door closed state of the door information is switched the door open state. As shown in FIGS. 6(e) and (f), the display control circuit 50 drives the pixels of the liquid crystal panel 70 to start the display of the odometer image 31 and the fuel level gauge image 32, such as digital display with numbers, in the liquid crystal display section 30 at the timing t2. By this operation of the display control circuit 50, the display of the odometer image 31 and the fuel level gauge image 32 is turned on, as shown in FIG. 3B.

The display control circuit 50 controls the liquid crystal display section 30 to stop the display of the vehicle information when a predetermined time period T3 (e.g., approximately 90 seconds) has elapsed since the display of the vehicle information in the liquid crystal display section 30 was restarted at the timing t2. As shown in FIGS. 6(e) and (f), the display control circuit 50 stops to drive the pixels of the liquid crystal panel 70 at the timing 3 where the predetermined time period P3 has elapsed from the timing t2. As such, the display of the odometer image 31 and the fuel level gauge image 32 is turned off. By this operation of the display control circuit 50, the display of the vehicle information in the liquid crystal display section 30 is turned off again, as shown in FIG. 3A.

Next, a processing of restarting the display of the liquid crystal display section 30 will be described with reference to FIG. 7. The processing shown in FIG. 7 is performed by the display control circuit 50 when the engine on state of the engine information is switched to the engine off state.

At S201, the pointer display section 20 and the liquid crystal display section 30 are controlled to stop the display of the vehicle information once, and the processing proceeds to S202. Thus, in the pointer display section 20, the pointers 21a through 24d are returned to the zero position, and thus the display of the vehicle information is turned off, as shown in FIG. 3A. In the liquid crystal display section 30, the images in the liquid crystal panel 70 are not formed, and thus the vehicle information is not shown in the liquid crystal display section 30, as shown in FIG. 3A.

At S202, it is determined whether or not the door information indicates the door open state. When it is determined at S202 that the door closed state of the door information is switched to the door open state, the processing proceeds to S203. On the other hand, when it is determined at S202 that the door information indicates the door closed state, the determination of S202 is repeated until the door closed state of the door information is switched to the door open state.

At S203, the liquid crystal display section 30 is controlled to restart the image display of the vehicle information, and the processing proceeds to S204. As such, the odometer image 31 and the fuel level gauge image 32 are shown in the liquid crystal panel 70, as shown in FIG. 3B.

At S204, the counting of time t is started from the timing t2 where the door closed state of the door information is switched to the door open state and the image display in the liquid crystal display section 30 is restarted.

At S205, it is determined whether or not the time t exceeds the timing t3. The timing t3 used in the determination of S205 is a value indicating the time that the predetermined time period P3 has elapsed from the timing t2 where the image display of the liquid crystal display section 30 was restarted. That is, it is determined whether or not the predetermined time period P2 has elapsed from the timing t2.

When it is determined at S205 that the time t exceeds the timing (value) t3, the processing proceeds to S206. On the other hand, when it is determined at S205 that the time t has not exceeds the timing t3, the determination of S205 is repeated until the time t exceeds the timing t3.

At S206, the liquid crystal display section 30 is controlled to stop the image display of the vehicle information again, and then the processing is ended. Thus, the odometer image 31 and the fuel level gauge image 32 on the liquid crystal panel 70 are turned off, as shown in FIG. 3A.

Also in the second embodiment, when the engine the engine on state of the engine information is switched to the engine off state, the display control circuit 50 controls the pointer display section 20 and the liquid crystal display section 30 to discontinue the display of the vehicle information once. Then, the display control circuit 50 controls the liquid crystal display section 30 to restart the display of the vehicle information. Therefore, the combination meter 200 can properly provide the vehicle information with the user after the engine is turned off.

Further, the image display of the vehicle information in the liquid crystal display section 30 is restarted when the door closed state of the door information is switched the door open state. In such a configuration, the display control circuit 50 can control the liquid crystal display section 30 to restart the image display at the timing where the door is opened by the user, such as the driver. In this way, the vehicle information is redisplayed at the proper timing in accordance with the door operation by the user. Therefore, the user can readily know the vehicle information.

Other Embodiments

Various exemplary embodiments of the present invention are described hereinabove. However, the present invention is not limited to the above described exemplary embodiments, but may be implemented in various other ways, such as in various combinations of the exemplary embodiments, without departing from the spirit of the invention.

In the above exemplary embodiments, the travel distance information and the fuel level information are displayed in the digital manner in the liquid crystal display section 30. That is, the odometer image 31 and the fuel level gauge image 32 are displayed with numbers in the liquid crystal display section 30. Alternatively, the vehicle information redisplayed in the liquid crystal display section 30, such as the odometer image 31 and the fuel level gauge image 32, can be displayed in analogue form.

Figure 8A:
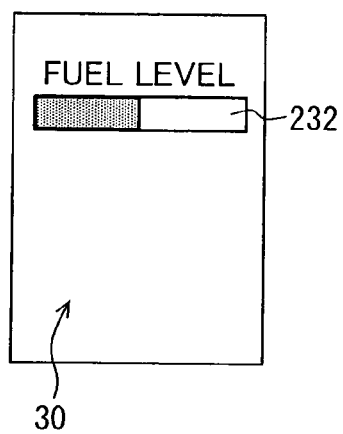
FIGS. 8A through 8C are front views of the liquid crystal display section illustrating modifications of the fuel level gauge image redisplayed in the liquid crystal display section.
Figure 8B:
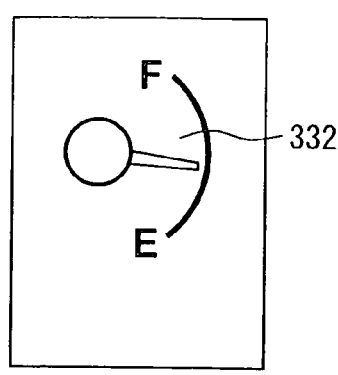
Figure 8C:
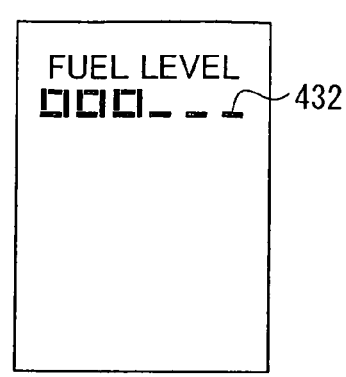

FIGS. 8A through 8C illustrate variations of the fuel level gauge image displayed in the analogue form in the liquid crystal display section 30. In the example of FIG. 8A, the fuel level information is shown by a fuel level gauge image 232 having a bar shape that extends in a lateral direction in accordance with the fuel level. The length of the bar shape image (e.g., a hatched portion) increases with the amount of the fuel level.

In the example of FIG. 8B, the fuel level information is shown by a fuel level gauge image 332 having a similar shape as the fuel gauge 22 of the pointer display section 20. In the fuel level gauge image 332, the fuel level is indicated by a pointer image that is shown in a rotational manner.

In the example of FIG. 8C, the fuel level information is shown by a fuel level gauge image 432 including a series of rectangular marks (e.g., rectangular boxes) 432. In the fuel level gauge image 432, the number of rectangular marks increases and decreases in accordance with the fuel level.

In the exemplary embodiments, the odometer image 31 and the fuel level gauge image 32 are redisplayed in the liquid crystal display section 30. Alternatively, the liquid crystal display section 30 may redisplay one of the odometer image 31 and the fuel level image 32. As further another example, the liquid crystal display section 30 may redisplay any images in addition to or alternative to the odometer image 31 and the fuel level gauge image 32 as the vehicle information.

Figure 9:
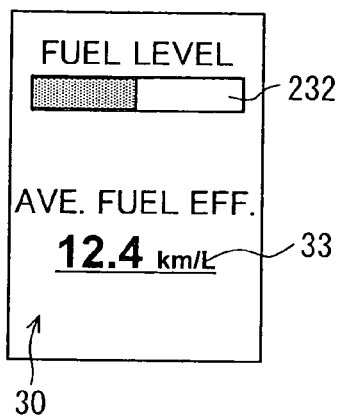
FIG. 9 is a front view of the liquid crystal display section illustrating a modification of the vehicle information image redisplayed in the liquid crystal display section.
Figure 10:
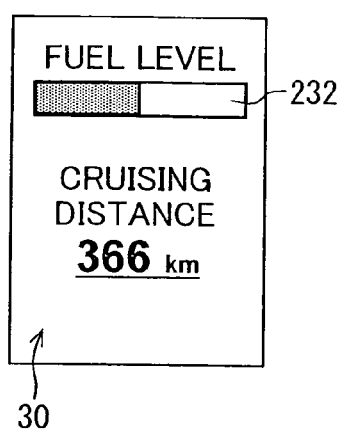
FIG. 10 is a front view of the liquid crystal display section illustrating another modification of the vehicle information image redisplayed in the liquid crystal display section.

For example, as shown in FIG. 9, the liquid crystal display section 30 can redisplay the fuel level gauge image 232 together with a fuel efficiency gauge image 33 showing an average fuel efficiency. As another example, the liquid crystal display section 30 can redisplay the fuel level gauge image 232 together with a cruising distance gauge image indicating a cruising distance calculated by the display control circuit 50 based on the fuel level information and the fuel efficiency information, as shown in FIG. 10.

Figure 11:
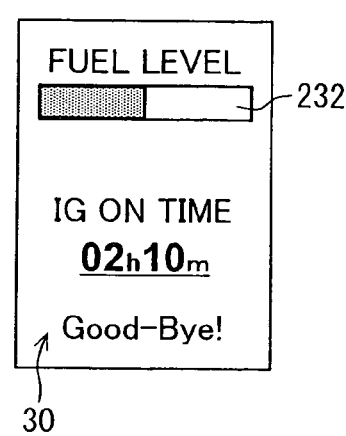
FIG. 11 is a front view of the liquid crystal display section illustrating further another modification of the vehicle information image redisplayed in the liquid crystal display section.

As further another example, the time period from where the ignition is turned on to where the ignition is turned off is counted, that is, the ignition-on time period is counted, and is displayed together with the fuel level gauge image 232 and a message image such as "Good-bye!" in the liquid crystal display section 30, as shown in FIG. 11. As still another example, the image(s) redisplayed in the liquid crystal display section 30 for indicating the vehicle information may be varied depending on a user's preference.

In the first embodiment, the vehicle information is redisplayed in the liquid crystal display section 30 when the predetermined time period P1 has elapsed since the ignition was turned off. Further, in the first and second embodiments, the redisplay of the vehicle information is discontinued when the predetermined time period P2 or P3 has elapsed since the redisplay was started. The predetermined time periods T1, T2, T3 are not limited to the above exemplary time periods, but may be modified, for example, depending on the user's preference. That is, the combination meter 100, 200 may be configured that the time periods T1, T2, T3 can be varied in accordance with the user's preference.

In the exemplary embodiments, the redisplay of the vehicle information is performed by the liquid crystal display section 30. Alternatively, the redisplay of the vehicle information may be performed by the pointer display section 20. For example, only the fuel gauge 22 of the pointer display section 20 may be restarted to display the fuel level information after the engine is stopped. As another example, both the pointer display section 20 and the liquid crystal display section 30 may restart the display of the vehicle information.

In the exemplary embodiments, the redisplay of the vehicle information is turned off when the predetermined time period P2, P3 has elapsed since the redisplay of the vehicle information was started. However, it is not always necessary to determine the timing of turning off the redisplay of the vehicle information based on the elapsing time from the redisplay. For example, the timing of turning off the redisplay of the vehicle information can be determined based on a detection of a user's door lock operation.

In the exemplary embodiments, the combination meter 100, 200 has both the pointer display section 20 and the liquid crystal display section 30. Alternatively, the combination meter 100, 200 may have one of the pointer display section 20 and the liquid crystal display section 30. In such a case, the vehicle information is displayed in the one of the pointer display section 20 and the liquid crystal display section 30.

In the exemplary embodiments, the display control circuit 50 acquires the vehicle information and the engine information and controls both the pointer display section 20 and the liquid crystal display section 30. That is, the information acquiring unit for acquiring the engine information and the vehicle information and the display control unit for controlling the pointer display section 20 and the liquid crystal display section 30 are provided by one display control circuit 50. However, the information acquiring unit and the display control unit are not limited to the above-described configuration. For example, the functions of the display control circuit 50 of the exemplary embodiments may be achieved by multiple circuits. Further, the functions of the display control circuit 50 may be achieved by an analogue circuit(s) without using a processor or the like for performing programs.

Additional advantages and modifications will readily occur to those skilled in the art. The invention in its broader term is therefore not limited to the specific details, representative apparatus, and illustrative examples shown and described.

What is claimed is:

1. A display device for a vehicle with an engine, the display device comprising:
    an information acquiring unit configured to acquire vehicle information regarding the vehicle, the vehicle information including engine information indicating an engine state as an ON-state or an OFF-state;
    a display unit configured to display the vehicle information acquired by the information acquiring unit; and
    a control unit configured to control the display unit to display the vehicle information when the engine information indicates the engine state as the ON-state, to immediately discontinue the operation of the display unit which immediately causes the display of the vehicle information to cease when the engine information indicates the engine state is switched to the OFF-state, to determine the occurrence of an event other than when the engine state is again indicated as the ON-state by the engine information, and, with the engine state being indicated as the OFF-state, to restart the operation of the display unit to restart display of the vehicle information after the occurrence of the event, wherein
    the event is when a predetermined period of time has elapsed since the engine state is switched to the OFF-state; and
    the control unit controls the display unit to restart the display of the vehicle information when the predetermined period of time has elapsed.

2. The display device according to claim 1, wherein
    the vehicle information includes gauge information associated with a dial plate having a scale;
    the display unit includes a pointer display section and an image display section, the pointer display section including the dial plate formed with the scale and a pointer rotating along the dial plate to indicate the gauge information associated with the scale, the image display section configured to show the gauge information by an image, and
    the control unit controls the pointer display section and the image display section to simultaneously discontinue the display of the gauge information when the engine state indicated in the engine information is switched from the ON-state to the OFF-state, and controls one of the pointer display section and the image display section to restart the display of the gauge information after the display of the pointer display section and the image display section is simultaneously discontinued.

3. The display device according to claim 2, wherein the one of the pointer display section and the image display section is the image display section.

4. The display device according to claim 3, wherein
    the control unit controls the image display section to display the gauge information in digital form.

5. The display device according to claim 3, wherein
    the control unit controls the image display section to discontinue the display of the gauge information again after the display of the gauge information is restarted.

6. The display device according to claim 5, wherein
    the gauge information redisplayed by the image display section includes at least one of travel distance information indicating a traveled distance of the vehicle and fuel level information indicating an amount of fuel in a fuel tank of the vehicle.

7. The display device according to claim 1, wherein
    the control unit controls the display unit to discontinue the display of the vehicle information again after the display of the vehicle information is restarted.

8. The display device according to claim 1, wherein
    the vehicle information redisplayed by the display unit includes travel distance information indicating a traveled distance of the vehicle.

9. The display device according to claim 1, wherein
    the vehicle information redisplayed by the display unit includes fuel level information indicating an amount of fuel in a fuel tank of the vehicle.

10. The display device according to claim 1, wherein
    the display unit does not display the engine information.

11. A display device for a vehicle with an engine, the display device comprising:
    an information acquiring unit configured to acquire vehicle information regarding the vehicle, the vehicle information including engine information indicating an engine state as an ON-state or an OFF-state and door information indicating an open and closed state of a door of the vehicle;
    a display unit configured to display the vehicle information acquired by the information acquiring unit; and
    a control unit configured to control the display unit to display the vehicle information when the engine information indicates the engine state as the ON-state, to immediately discontinue the operation of the display unit which immediately causes the display of the vehicle information to cease when the engine information indicates the engine state is switched to the OFF-state, to determine the occurrence of an event other than when the engine state is again indicated as the ON-state by the engine information, and, with the engine state being indicated as the OFF-state, to restart the operation of the display unit to restart display of the vehicle information after the occurrence of the event, wherein
    the event is when the door of the vehicle is switched from a closed state to an open state,
    with the engine state indicated as the OFF-state, the control unit controls the display unit to restart the display of the vehicle information when the door closed state indicated by the door information is switched to the door open state, and
    with the engine state indicated as the OFF-state, the control unit controls the display unit to discontinue the display of the vehicle information after a predetermined time period elapsed after the control unit restarted the display of the vehicle information.

* * * * *